(12) United States Patent
Hock et al.

(10) Patent No.: US 7,714,844 B2
(45) Date of Patent: May 11, 2010

(54) DYNAMIC SELF-SWITCHABLE CPI RESOLUTION FOR AN OPTICAL MOUSE SENSOR

(75) Inventors: Bernard Chan Lye Hock, Penang (MY); Mau Ming Yong, Penang (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1054 days.

(21) Appl. No.: 11/408,407

(22) Filed: Apr. 21, 2006

(65) Prior Publication Data

US 2007/0247428 A1     Oct. 25, 2007

(51) Int. Cl.
*G06F 3/02* (2006.01)
*G09G 5/00* (2006.01)

(52) U.S. Cl. ........................ 345/166; 345/156
(58) Field of Classification Search ............ 345/166
See application file for complete search history.

(56) References Cited

U.S. PATENT DOCUMENTS 6,303,924 B1 * 10/2001 Adan et al. ............. 250/221
2005/0001817 A1 * 1/2005 Lauffenburger et al. ..... 345/166

\* cited by examiner

*Primary Examiner*—Kevin M Nguyen
*Assistant Examiner*—Cory A Almeida

(57) ABSTRACT

An optical mouse employs an optical mouse controller and an optical mouse sensor. In operation, the optical mouse sensor generates an image sensing report signal indicative of a movement of the optical mouse over a surface of an object and communicates the image sensing report signal to the optical mouse controller based on a CPI resolution setting of the optical mouse sensor. To be responsive to varying applications, the optical mouse sensor detects a dynamic movement variable associated with the movement of the optical mouse over the surface of the object and controls a switching of the CPI resolution setting among at least two different CPI resolutions based on a detection of the dynamic movement variable.

21 Claims, 6 Drawing Sheets

DYNAMIC SELF-SWITCHABLE CPI RESOLUTION FOR AN OPTICAL MOUSE SENSOR

FIELD OF THE INVENTION

The present invention generally relates to an optical mouse sensor employed within an optical mouse. The present invention specifically relates to an optical mouse sensor controlling a dynamic switching of its counts per inch ("CPI") resolution where the CPI resolution is indicative of how many times per inch of optical mouse movement that the optical mouse sensor sends an image sensing report signal to an optical mouse controller.

BACKGROUND OF THE INVENTION

Digital entertainment (e.g., online gaming, downloadable movies, music and TV programming) is driving the need for new, higher-performance PC input devices. Mouse navigation is of particular importance as PCs and laptops move into less-traditional environments, such as, for example, kitchens, bedrooms and the local coffee shop. Such locations often require mouse navigation on surfaces such as wood-grain or laminate that can cause today's optical mice to falter. In addition, applications such as high-speed online gaming require fast responsiveness and high position accuracy, regardless of location.

To address this growing demand, a patented LaserStream product line offered by the assignee of the present invention includes three versions of laser navigation sensors and mouse bundles.

First, an ADNS-6000 laser navigation sensor/ADNB-600X bundle for high-end corded mice features 800 CPI resolution, 20 inches per second ("IPS") maximum velocity and 6,400 frames per second ("FPS") frame rate.

Second, an ADNS-6030 laser navigation sensor/ADNB-603X bundle for high-end cordless mice features up to 800 CPI resolution, 20 IPS maximum velocity, and enhanced self-adjusting frame rate, along with low power consumption for battery life of up to six months.

Finally, anADNS-6010 laser navigation sensor/ADNB-601X bundle optimized for the gaming environment and other specialized high-performance applications features 2,000 CPI resolution, 45 IPS maximum velocity and 7,080 FPS frame rate.

The CPI resolution for all three of the aforementioned laser navigation sensors and mouse bundles are fixed and are therefore more suitable for applications that are compatible with the fixed CPI resolution and less suitable for applications that are incompatible with the fixed CPI resolution. Thus, there is a need to have a dynamic switching CPI resolution responsive to the needs of various applications.

SUMMARY OF THE INVENTION

The present invention provides a new and unique dynamic self-switching CPI resolution for an optical mouse sensor.

One form of the present invention is an optical mouse comprising an optical mouse sensor and an optical mouse controller. In operation, the optical mouse sensor generates an image sensing report signal indicative of a movement of the optical mouse over a surface of an object and communicates the image sensing report signal to the optical mouse controller based on a CPI resolution setting of the optical mouse sensor, wherein the optical mouse sensor detects a dynamic movement variable associated with the movement of the optical mouse over the surface of the object and controls a switching of the CPI resolution setting among at least two different CPI resolutions based on detection of the dynamic movement variable.

More particularly, the optical mouse sensor can include a processor and a memory operable with the processor to execute instructions for detecting the dynamic movement variable and controlling the switching of the CPI resolution setting among the different CPI resolution(s) based on the detection of the dynamic movement variable.

A second form of the present invention is method of operating an optical mouse sensor to generate an image sensing report signal indicative of a movement of the optical mouse over a surface of an object and to communicate the image sensing report signal to the optical mouse controller based on a CPI resolution setting of the optical mouse sensor. The method involves the optical mouse sensor detecting a dynamic movement variable associated with the movement of the optical mouse over the surface of the object and controlling a switching of the CPI resolution setting among at least two different CPI resolutions based on detection of the dynamic movement variable.

The aforementioned forms and additional forms as wells as objects and advantages of the present invention will become further apparent from the following detailed description of the various embodiments of the present invention read in conjunction with the accompanying drawings. The detailed description and drawings are merely illustrative of the present invention rather than limiting, the scope of the present invention being defined by the appended claims and equivalents thereto.

BRIEF DESCRIPTION OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
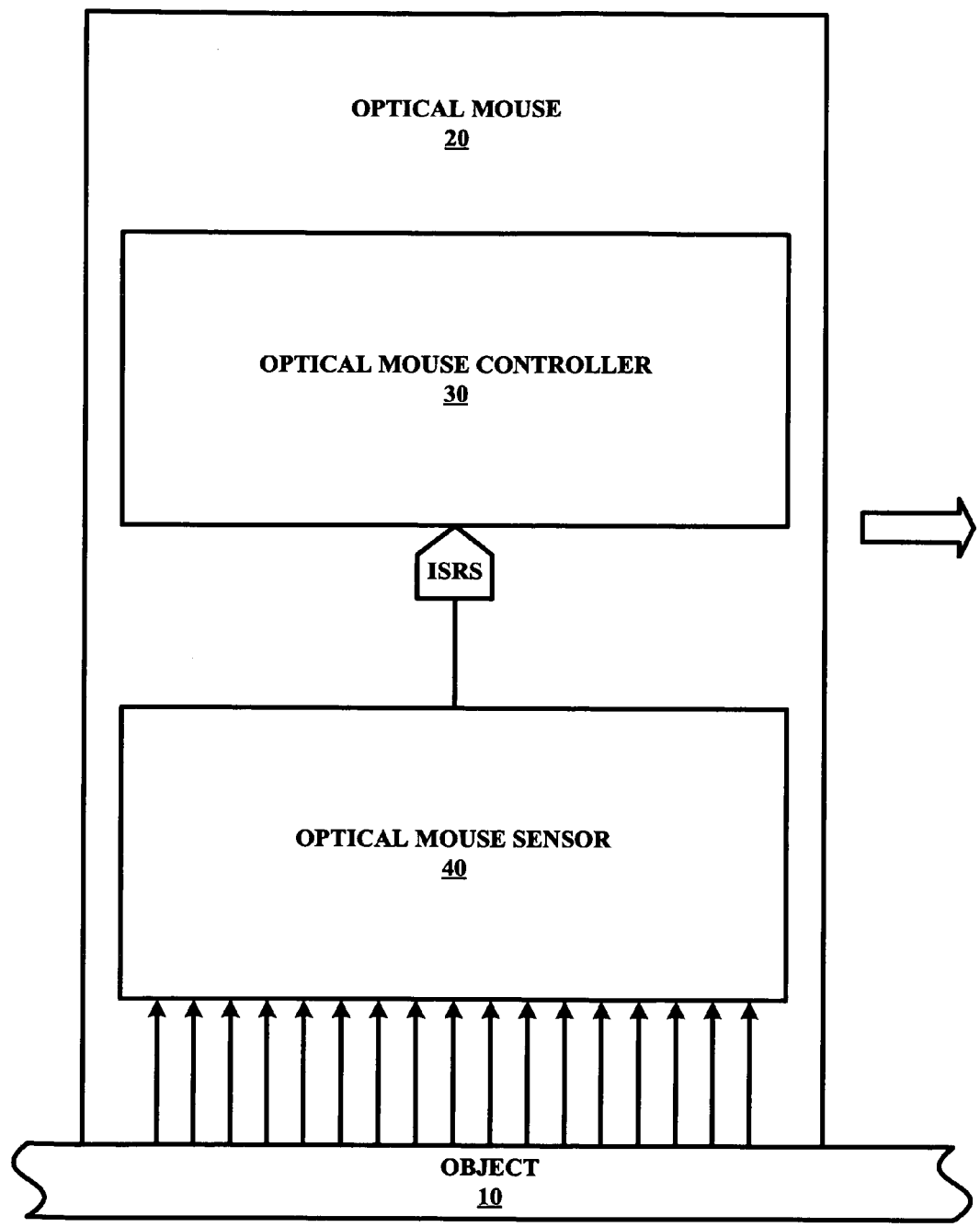
FIG. 1 illustrates a block diagram of one embodiment of an optical mouse in accordance with the present invention.

FIG. 1 illustrates an optical mouse 20 employing an optical mouse controller 30 and an optical mouse sensor 40. In operation, as optical mouse 20 is moved across a surface of an object 10 as shown for purposes of performing a navigation function, optical mouse sensor 40 senses moving images of the surface of object 10 via an illumination reflection of the surface of object 10 as represented by the upward pointing arrows and communicates a generated image sensing report signal ISRS indicative of the moving images of the surface of object 10 to optical mouse controller 30. In response to image sensing report signal ISRS, optical mouse controller 30 determines a state of optical mouse sensor 40 for purposes of determining a current position of optical mouse 20 relative to the surface of object 10 and communicates any change in the current position of optical mouse 20 to a computer data interface controller (not shown).

Figure 2:
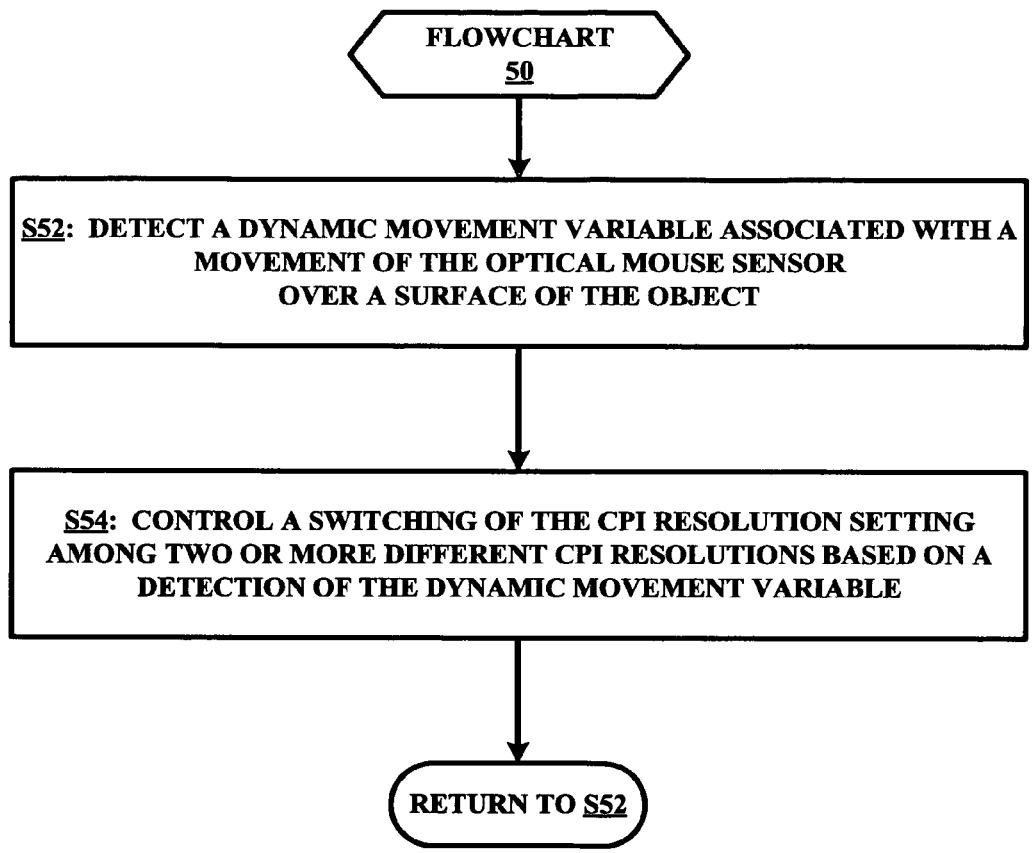
FIG. 2 illustrates a flowchart representative of one embodiment of a CPI resolution setting method in accordance with the present invention.

A CPI resolution of optical mouse sensor 40 as known in the art is a measurement of how many times optical mouse sensor 40 communicates image sensing report signal ISRS to optical mouse controller 30 on a per specified dimensional length of optical mouse movement basis (e.g., number of image sensing report signal ISRS communications per inch of optical mouse movement). The present invention is premised on optical mouse sensor 40 controlling a setting of its CPI resolution for purposes of operating at a CPI resolution setting that is appropriate for the current application of optical mouse 20. To this end, during each navigation function of optical mouse 20, optical mouse sensor 40 implements a dynamic CPI resolution setting method of the present invention as represented by a flowchart 50 illustrated in FIG. 2.

A stage S52 of flowchart 50 encompasses optical mouse sensor 40 detecting a dynamic movement variable associated the movement of optical mouse sensor 40 over the surface of object 10 for purposes of performing the navigation function. In practice, the dynamic movement variable can be any type of measurable factor, characteristic, or attribute of the movement of optical mouse sensor 40 over the surface of object 10.

In a first exemplary embodiment, the dynamic movement variable is a velocity of the movement of optical mouse 20 over the surface of object 10. In a second exemplary embodiment, the dynamic movement variable is an acceleration of the movement of optical mouse 20 over the surface of the object. In a third exemplary embodiment, the dynamic movement variable is a user CPI resolution preference of the movement of optical mouse 20 over the surface of object 10.

A stage S54 of flowchart 50 encompasses optical mouse sensor 40 controlling a switching of its CPI resolution setting among two or more different CPI resolutions based on a detection of the dynamic movement variable. In practice, the present invention does not impose any limitations or any restrictions to the number of CPI resolutions designed for optical mouse sensor 40 and the number of detectable dynamic movement variables associated with the movement of optical mouse 20 over the surface of object 10.

Figure 3:
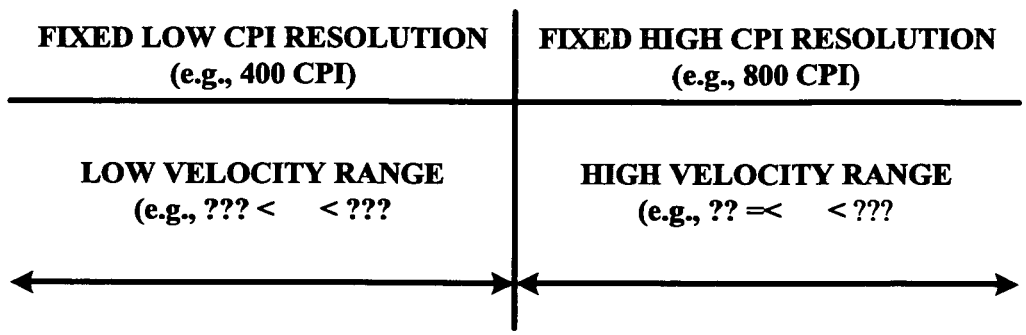
FIGS. 3-5 illustrates an exemplary table of a low CPI resolution and high CPI resolution correspondence with a dynamic movement variable in accordance with the present invention.

In a first exemplary embodiment as shown in FIG. 3, a velocity of the movement of optical mouse 20 over the surface of object 10 being within a low velocity range (e.g., NEED AN SAMPLE RANGE) corresponds to a fixed low CPI resolution (e.g., 400 CPI resolution) and a velocity of the movement of optical mouse 20 over the surface of object 10 being within a high velocity range (e.g., NEED AN SAMPLE RANGE) corresponds to a fixed high CPI resolution (e.g., 800 CPI resolution).

Figure 4:
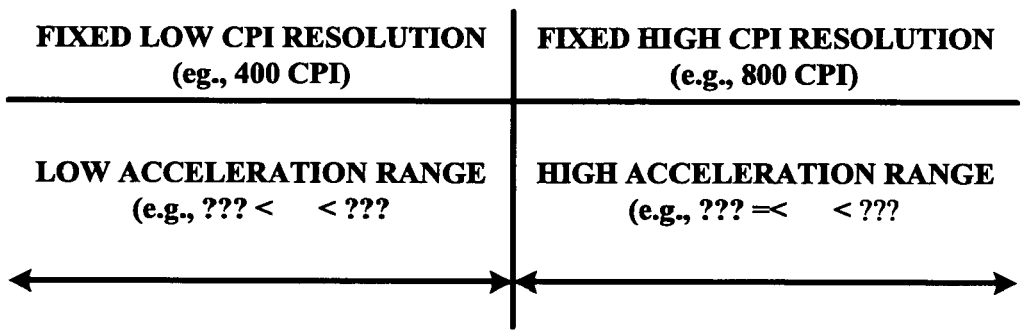

In a second exemplary embodiment as shown in FIG. 4, an acceleration of the movement of optical mouse 20 over the surface of object 10 being within a low acceleration range (e.g., NEED AN SAMPLE RANGE) corresponds to a fixed low CPI resolution (e.g., 400 CPI resolution) and an acceleration of the movement of optical mouse 20 over the surface of object 10 being within a high acceleration range (e.g., NEED AN SAMPLE RANGE) corresponds to a fixed high CPI resolution (e.g., 800 CPI resolution).

Figure 5:
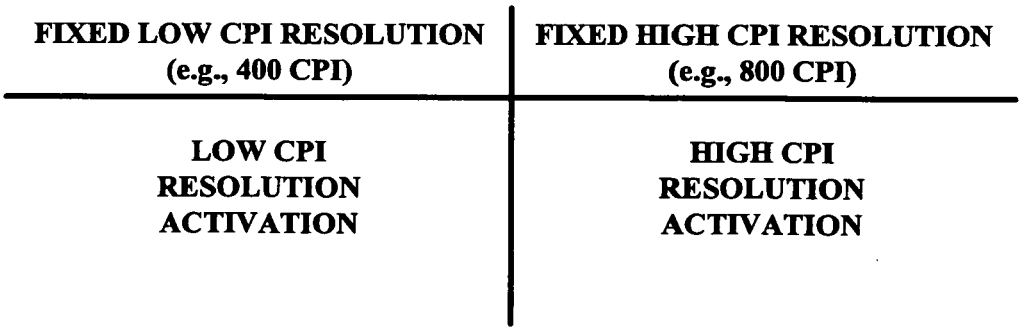

In a third exemplary embodiment as shown in FIG. 5, a user fixed low CPI resolution preference of the movement of optical mouse 20 over the surface of object 10 corresponds to a low CPI resolution activation (e.g., a pushing of a CPI resolution button or some designated component of optical mouse 20) and a user fixed high CPI resolution preference of optical mouse sensor 40 of the movement of optical mouse 20 over the surface of object 10 corresponds to a high CPI resolution activation (e.g., a pushing of a CPI resolution button or some designated component of optical mouse 20).

To further facilitate an understanding of the inventive principles of the present invention, more detailed embodiments of flowchart 50 will now be described herein in connection with a flowchart 60 illustrated in FIG. 6 and a flowchart 70 illustrated in FIG. 7.

Figure 6:
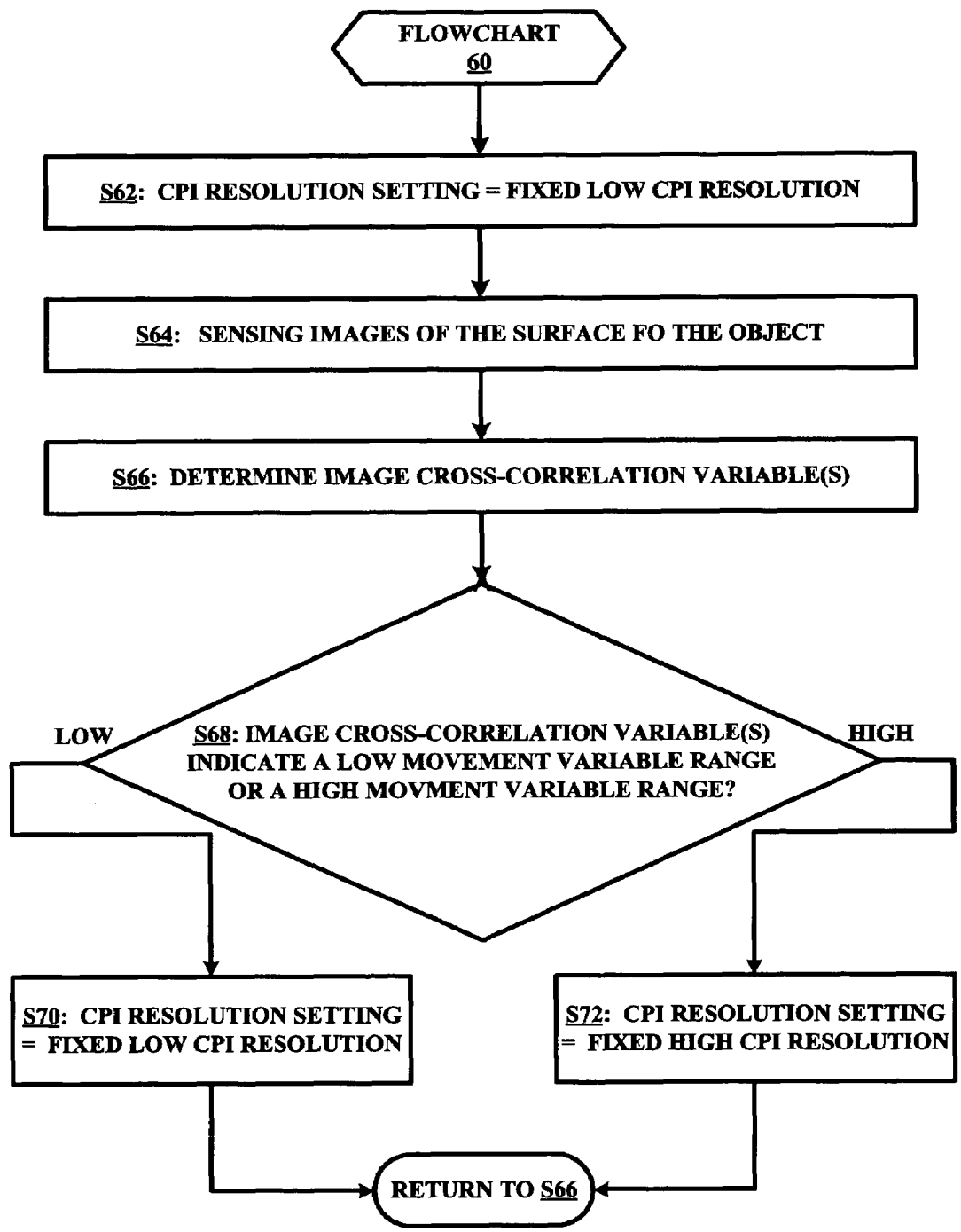
FIG. 6 illustrates a flowchart representative of a first embodiment of the CPI resolution setting method illustrated in FIG. 2 in accordance with the present invention.

Referring to FIGS. 1 and 6, prior to a movement of optical mouse 20 over the surface of object 10, a stage S62 of flowchart 60 encompasses optical mouse sensor 40 setting its CPI resolution equal to a fixed low CPI resolution (e.g., 400 CPI resolution). Upon a movement of optical mouse 20 over the surface of object 10 for purposes of performing a navigation function, a stage S64 of flowchart 60 encompasses optical mouse sensor 40 sensing images of the surface of the object 10 to thereby generate and communicate image sensing report signal ISRS to optical mouse controller 30 based on its CPI resolution setting.

Stage S64 continues until the movement of optical mouse 20 over the surface of object 10 is completed for purposes of the navigation function. Nonetheless, during the execution of stage S64, optical mouse sensor 40 loops through stages S66-S72 to ensure its CPI resolution setting is compatible with the application of optical mouse 20.

Specifically, a stage S66 of flowchart 60 encompasses optical mouse sensor 40 determining one or more image cross-correlation variables based on two or more of the sensed images of the surface of object 10. In one exemplary embodiment, the image cross-correlation variables include a $\Delta X$ variable and a $\Delta Y$ variable derived from a cross-correlation of two or more sensed images of the surface of object 10 where $\Delta X$ variable is indicative of a degree of movement of optical sensor 40 over the surface of the object relative to an X axis of the surface of the object and $\Delta Y$ variable is indicative of a degree of movement of optical sensor 40 over the surface of the object relative to a Y axis of the surface of the object.

A stage S68 of flowchart 60 encompasses optical mouse sensor 40 determining whether the image cross-correlation variable(s) indicate a low movement variable range or a high movement variable range. In practice, this determination can be based on a comparison of each image cross-correlation variable to a threshold representative of a boundary between the low movement variable range and the high movement variable range. For example, the $\Delta X$ variable being less than the threshold indicates a low movement variable range and the $\Delta X$ variable being equal to or higher than the threshold indicates a high movement variable range.

In one exemplary embodiment of stage S68, optical mouse sensor 40 determines whether the $\Delta X$ variable and the $\Delta Y$ variable indicate optical mouse 20 is moving over the surface of object 10 with a velocity in the low velocity range of FIG. 3 or in the high velocity range of FIG. 3. If the velocity of the movement of optical mouse 20 over the surface of object 10 is within the low velocity range, then optical mouse sensor 40 proceeds to a stage S70 of flowchart 60 to set or maintain a setting of its CPI resolution equal to the fixed low CPI resolution (e.g., 400 CPI resolution). Otherwise, if the velocity of the movement of optical mouse 20 over the surface of object 10 is within the high velocity range, then optical mouse sensor 40 proceeds to a stage S72 of flowchart 60 to set or maintain a setting of its CPI resolution equal to the fixed high CPI resolution (e.g., 800 CPI resolution).

In another exemplary embodiment of stage S68, optical mouse sensor 40 determines whether the ΔX variable and the ΔY variable indicate optical mouse 20 is moving over the surface of object 10 with a acceleration in the low acceleration range of FIG. 3 or in the high acceleration range of FIG. 3. If the acceleration of the movement of optical mouse 20 over the surface of object 10 is within the low acceleration range, then optical mouse sensor 40 proceeds to stage S70 to set or maintain a setting of its CPI resolution equal to the fixed low CPI resolution (e.g., 400 CPI resolution). Otherwise, if the acceleration of the movement of optical mouse 20 over the surface of object 10 is within the high acceleration range, then optical mouse sensor 40 proceeds to stage S72 to set or maintain a setting of its CPI resolution equal to the fixed high CPI resolution (e.g., 800 CPI resolution).

Upon completion of stage S70 or stage S72, then optical mouse sensor 40 returns to stage S64 to reiterate the dynamic CIP resolution setting loop of stages S76-S82. Those having ordinary skill in the art will appreciate that the CPI resolution setting of optical mouse sensor 40 may not be switched or may be switched one or more times in dependence upon how optical mouse 20 is moved over the surface of object 10 during the performance of the navigation function.

Figure 7:
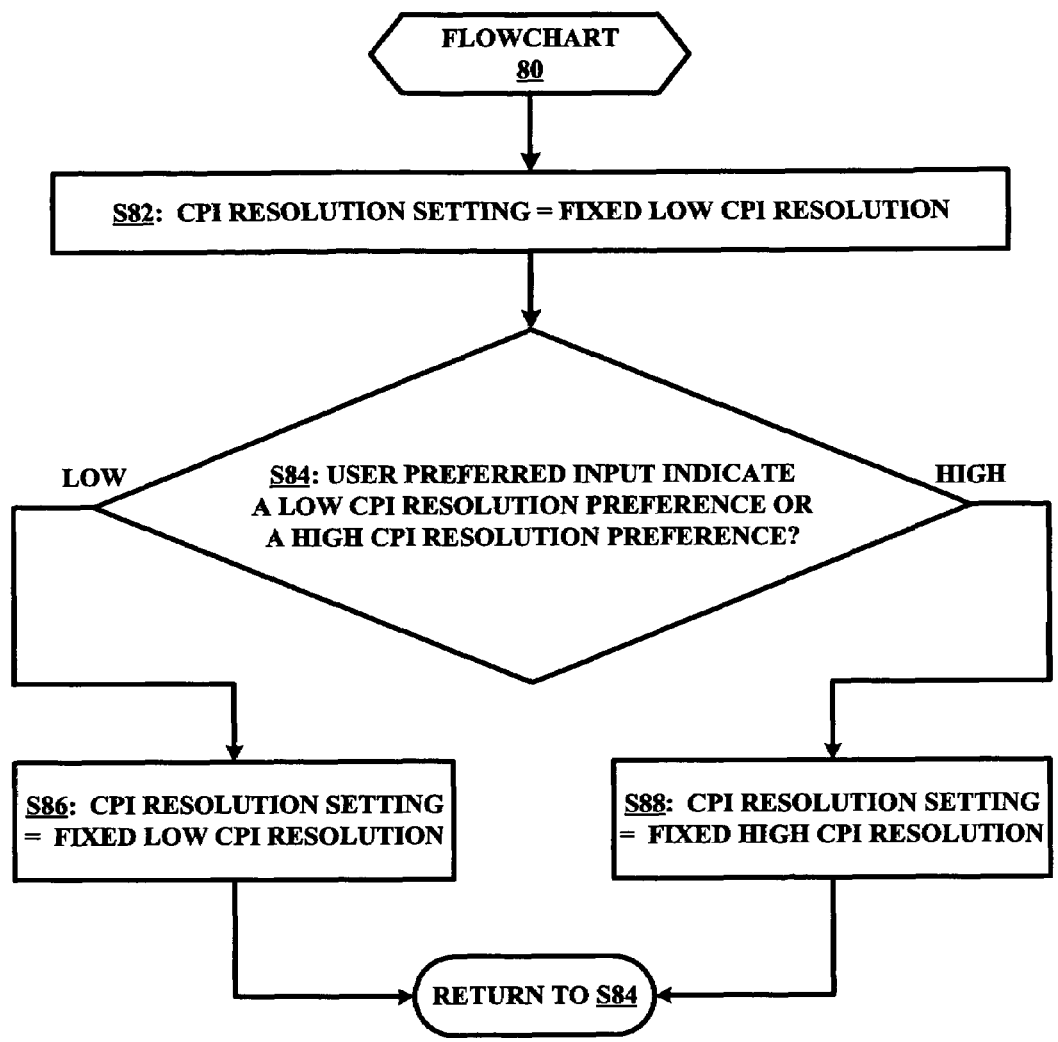
FIG. 7 illustrates a flowchart representative of a second embodiment of a CPI resolution setting method illustrated in FIG. 2 in accordance with the present invention.

Referring to FIGS. 1 and 7, prior to a movement of optical mouse 20 over the surface of object 10, a stage S82 of flowchart 80 encompasses optical mouse sensor 40 setting its CPI resolution equal to a fixed low CPI resolution (e.g., 400 CPI resolution). Upon a movement of optical mouse 20 over the surface of object 10 for purposes of performing a navigation function, a stage S84 of flowchart 80 encompasses optical mouse sensor 40 determining whether a user preferred input is indicating a low CPI resolution preference or a high CPI resolution preference. In practice, the present invention does not impose any limitations or any restrictions as to the manner by which optical mouse sensor 40 determines the user preferred input.

If optical mouse sensor 40 determines the user preferred input is indicating the low CPI resolution preference, then optical mouse sensor 40 proceeds to a stage S86 of flowchart 80 to set or maintain a setting of its CPI resolution equal to the fixed low CPI resolution (e.g., 400 CPI resolution). Otherwise, if optical mouse sensor 40 determines the user preferred input is indicating the high CPI resolution preference, then optical mouse sensor 40 proceeds to a stage S88 of flowchart 80 to set or maintain a setting of its CPI resolution equal to the fixed high CPI resolution (e.g., 800 CPI resolution).

The loop execution of stages S84-S88 continues until the movement of optical mouse 20 over the surface of object 10 is completed for purposes of the navigation function to ensure its CPI resolution setting is compatible with the application of optical mouse 20.

Figure 8:
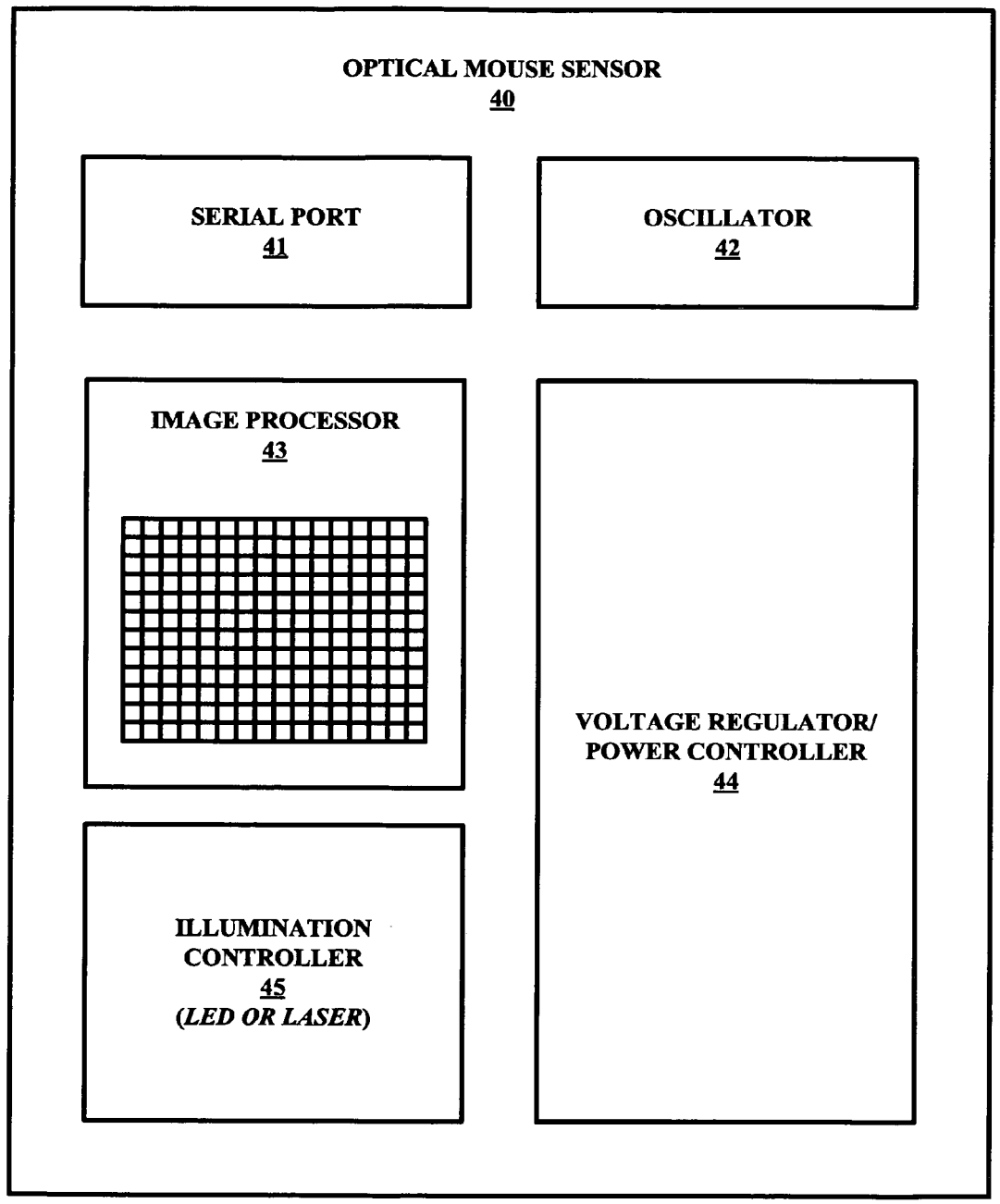
FIG. 8 illustrates a block diagram of one embodiment of an optical mouse sensor in accordance with the present invention.

FIG. 8 illustrates one exemplary embodiment of optical mouse sensor 40 employing a serial port 41, an oscillator 42, an image processor 43, a voltage regulator/power controller 44 and an illumination controller 45 (LED or laser). Image processor 43 is responsible for implementing a dynamic CPI resolution setting method of the present invention under the inventive principles of the present invention. To this end, image processor 43 can use software and/or firmware to implement a dynamic CPI resolution setting method of the present invention as instructions executable by image processor 43.

Referring to FIG. 1, those having ordinary skill in the art will appreciate how to apply the inventive principles of the present invention to any type of optical mouse sensor, particularly optical mouse sensors having a more highly structured configuration that the optical mouse sensor illustrated in FIG. 1, such as, for example, an optical mouse employing multiple optical mouse sensors in communication with the optical mouse controller and/or an optical mouse having additional fixed CPI resolutions and additional ranges (velocity and/or acceleration) for a dynamic movement variable or variables.

Referring to FIGS. 1-4, those having ordinary skill in the art will further appreciate numerous advantages and benefits of the present invention, including, but not limited to, a CPI resolution setting of an optical mouse sensor that is dynamically controlled by the optical mouse sensor to suit any particular application.

While the embodiments of the invention disclosed herein are presently considered to be preferred, various changes and modifications can be made without departing from the scope of the invention. The scope of the invention is indicated in the appended claims and all changes that come within the meaning and range of equivalents are intended to be embraced therein.

What is claimed is:

1. An optical mouse, comprising:
   an optical mouse controller; and
   an optical mouse sensor operable to dynamically set a CPI resolution for generating an image sensing report signal indicative of a movement of the optical mouse over a surface of an object and to communicate the image sensing report signal to the optical mouse controller, wherein dynamically setting the CPI resolution includes
   determining a dynamic movement variable associated with the movement of the optical mouse over the surface of the object, and
   selecting from amongst a plurality of CPI resolutions, the selecting comprising: a) automatically selecting a high CPI resolution upon determining that the dynamic movement variable falls within a first range of predetermined variable values, and b) automatically selecting a low CPI resolution upon determining that the dynamic movement variable falls within a second range of predetermined variable values, wherein the second range is different than the first range.

2. The optical mouse of claim 1, wherein the dynamic movement variable is a velocity of the movement of the optical mouse over the surface of the object.

3. The optical mouse of claim 1, wherein the first range of predetermined variable values correspond to a low velocity range of movement of the optical mouse over the surface of the object; and the second range of the predetermined variable values correspond to a high velocity range of the movement of the optical mouse over the surface of the object.

4. The optical mouse of claim 1, wherein the dynamic movement variable is an acceleration of the movement of the optical mouse over the surface of the object.

5. The optical mouse of claim 1, wherein the first range of predetermined variable values correspond to a low acceleration range of movement of the optical mouse over the surface of the object; and wherein the second range of the predetermined variable values correspond to a high acceleration range of the movement of the optical mouse over the surface of the object.

6. The optical mouse of claim 1, wherein determining the dynamic movement variable is based on a cross-correlation of at least two images of the surface of the object as sensed by the optical motion sensor.

7. The optical mouse of claim 1, wherein selecting from amongst the plurality of CPI resolutions further comprises using a user CPI resolution preference.

8. An optical mouse, comprising:
an optical mouse controller; and
an optical mouse sensor,
   wherein the sensor includes a processor and a memory operable with the processor to dynamically set a CPI resolution for generating an image sensing report signal indicative of a movement of the optical mouse over a surface of an object and to communicate the image sensing report signal to the optical mouse controller,
   wherein dynamically setting the CPI resolution includes determining a dynamic movement variable associated with the movement of the optical mouse over the surface of the object, and selecting from amongst a plurality of CPI resolutions, the selecting comprising: a) automatically selecting a high CPI resolution upon determining that the dynamic movement variable falls within a first range of predetermined variable values, and b) automatically selecting a low CPI resolution upon determining that the dynamic movement variable falls within a second range of predetermined variable values.

9. The optical mouse of claim 8, wherein the dynamic movement variable is a velocity of the movement of the optical mouse over the surface of the object.

10. The optical mouse of claim 8, wherein the first range of predetermined variable values correspond to a low velocity range of movement of the optical mouse over the surface of the object; and the second range of the predetermined variable values correspond to a high velocity range of the movement of the optical mouse over the surface of the object.

11. The optical mouse of claim 8, wherein the dynamic movement variable is an acceleration of the movement of the optical mouse over the surface of the object.

12. The optical mouse of claim 8, wherein the first range of predetermined variable values correspond to a low acceleration range of movement of the optical mouse over the surface of the object; and the second range of the predetermined variable values correspond to a high acceleration range of the movement of the optical mouse over the surface of the object.

13. The optical mouse of claim 8, wherein determining the dynamic movement variable is based on a cross-correlation of at least two images of the surface of the object as sensed by the optical motion sensor.

14. The optical mouse of claim 8, wherein selecting from amongst the plurality of CPI resolutions further comprises using a user CPI resolution preference.

15. In an optical mouse including an optical mouse controller and an optical mouse sensor, a method of operating an optical mouse sensor in dynamically setting a CPI resolution for generating an image sensing report signal indicative of a movement of the optical mouse over a surface of an object and communicating the image sensing report signal to the optical mouse controller, the method comprising:
   determining a dynamic movement variable associated with the movement of the optical mouse over the surface of the object, and
   selecting from amongst a plurality of CPI resolutions, the selecting comprising: a) automatically selecting a high CPI resolution upon determining that the dynamic movement variable falls within a first range of predetermined variable values, and b) automatically selecting a low CPI resolution upon determining that the dynamic movement variable falls within a second range of predetermined variable values.

16. The method of claim 15, wherein the dynamic movement variable is a velocity of the movement of the optical mouse over the surface of the object.

17. The method of claim 15, wherein the first range of predetermined variable values correspond to a low velocity range of movement of the optical mouse over the surface of the object; and the second range of the predetermined variable values correspond to a high velocity range of the movement of the optical mouse over the surface of the object.

18. The method of claim 15, wherein the dynamic movement variable is an acceleration of the movement of the optical mouse over the surface of the object.

19. The method of claim 15, wherein the first range of predetermined variable values correspond to a low acceleration range of movement of the optical mouse over the surface of the object; and the second range of the predetermined variable values correspond to a high acceleration range of the movement of the optical mouse over the surface of the object.

20. The method of claim 15, wherein the detection of the dynamic movement variable is based on a cross-correlation of at least two images of the surface of the object as sensed by the optical motion sensor.

21. The method of claim 15, wherein selecting from amongst the plurality of CPI resolutions further comprises using a user CPI resolution preference.

* * * * *